(12) United States Patent
Zhang et al.

(10) Patent No.: US 9,253,087 B2
(45) Date of Patent: Feb. 2, 2016

(54) PRINCIPAL-IDENTITY-DOMAIN BASED NAMING SCHEME FOR INFORMATION CENTRIC NETWORKS

(71) Applicant: Futurewei Technologies, Inc., Plano, TX (US)

(72) Inventors: Xinwen Zhang, San Ramon, CA (US); Guo-Qiang Wang, Santa Clara, CA (US); Ravishankar Ravindran, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 389 days.

(21) Appl. No.: 13/729,897

(22) Filed: Dec. 28, 2012

(65) Prior Publication Data

US 2013/0282920 A1    Oct. 24, 2013

Related U.S. Application Data

(60) Provisional application No. 61/637,673, filed on Apr. 24, 2012.

(51) Int. Cl.
*H04L 12/56* (2006.01)
*H04L 12/741* (2013.01)
(Continued)

(52) U.S. Cl.
CPC ............ *H04L 45/74* (2013.01); *H04L 45/64* (2013.01); *H04L 67/28* (2013.01); *H04L 67/2842* (2013.01); *H04L 67/2847* (2013.01); *H04L 67/2852* (2013.01); *H04L 67/327* (2013.01); *H04L 9/3247* (2013.01); *H04L 45/745* (2013.01); *H04L 63/20* (2013.01); *H04L 65/4084* (2013.01); *H04L 67/02* (2013.01); *H04L 67/2857* (2013.01); *H04L 67/42* (2013.01)

(58) Field of Classification Search
None
See application file for complete search history.

(56) References Cited

U.S. PATENT DOCUMENTS

2004/0098615 A1    5/2004   Mowers et al.
2007/0250560 A1*  10/2007  Wein et al. .................... 709/201
(Continued)

FOREIGN PATENT DOCUMENTS

| CN | 1959724 A | 5/2007 |
| CN | 102143199 A | 8/2011 |
| EP | 2120402 A1 | 11/2009 |

OTHER PUBLICATIONS

Koponen, Teemu, et al. "A data-oriented (and beyond) network architecture." ACM SIGCOMM Computer Communication Review. vol. 37. No. 4. ACM, 2007.*

(Continued)

*Primary Examiner* — Chris Parry
*Assistant Examiner* — Caroline Jahnige
(74) *Attorney, Agent, or Firm* — Conley Rose, P.C.; Grant Rodolph; Richard J. Mason

(57) ABSTRACT

A network node in an information centric network (ICN), comprising a receiver configured to receive a request for content from a user, wherein the request comprises a name, wherein the name uniquely identifies the content associated with the name, wherein the name provides persistently locatable routing to the content, wherein the name provides meaning to an application, and wherein the name comprises a security verifier, a processor coupled to the receiver and configured to determine a next hop to which to forward the request based on the name, and a transmitter coupled to the processor and configured to forward the request to the next hop.

20 Claims, 9 Drawing Sheets

(51) Int. Cl.
*H04L 12/715* (2013.01)
*H04L 29/08* (2006.01)
*H04L 29/06* (2006.01)
*H04L 9/32* (2006.01)

(56) References Cited

U.S. PATENT DOCUMENTS

2009/0287835 A1* 11/2009 Jacobson .................... 709/229
2009/0288163 A1* 11/2009 Jacobson et al. ................ 726/22
2012/0158973 A1* 6/2012 Jacobson et al. ............. 709/227
2013/0041982 A1   2/2013 Shi et al.

OTHER PUBLICATIONS

Balakrishnan, Hari, et al. "A layered naming architecture for the Internet." ACM SIGCOMM Computer Communication Review. vol. 34. No. 4.ACM, 2004.*
Jacobson, V., et al., "Networking Named Content," XP002608160, Oct. 13, 2009, 14 pages.
Foreign Communication From A Counterpart Application, European Application No. 13780561.0, Extended European Search Report dated Aug. 27, 2014, 4 pages.
Foreign Communication From a Counterpart Application, PCT Application No. PCT/CN2013/074495, International Search Report dated Aug. 1, 2013, 6 pages.
Foreign Communication From a Counterpart Application, PCT Application No. PCT/CN2013/074495, Written Opinion dated Aug. 1, 2013, 4 pages.
Koponen, T., et al., "A Data-Oriented (and Beyond) Network Architecture," SIGCOMM '07, Aug. 27-31, 2007, Kyoto, Japan, 12 pages.
Ghodsi, A., et al., "Naming in Content-Oriented Architectures," SIGCOMM ICN '11, Aug. 19, 2011, Toronto, Ontario, Canada, 6 pages.
Baugher, M., et al., "Self-Verifying Names for Read-Only Named Data," Computer Communications Workshops (INFOCOM WKSHPS), 31th Annual International Conference on Computer Communications, 2012 IEEE Conference, Mar. 25-30, 2012, pp. 274-279.
Smetters, D., et al., "Securing Network Content," TR-2009-01, Oct. 2009, 9 pages.
Narayanan, A., et al., "NDN and IP Routing Can It Scale?," Cisco, 2011, 26 pages.

* cited by examiner

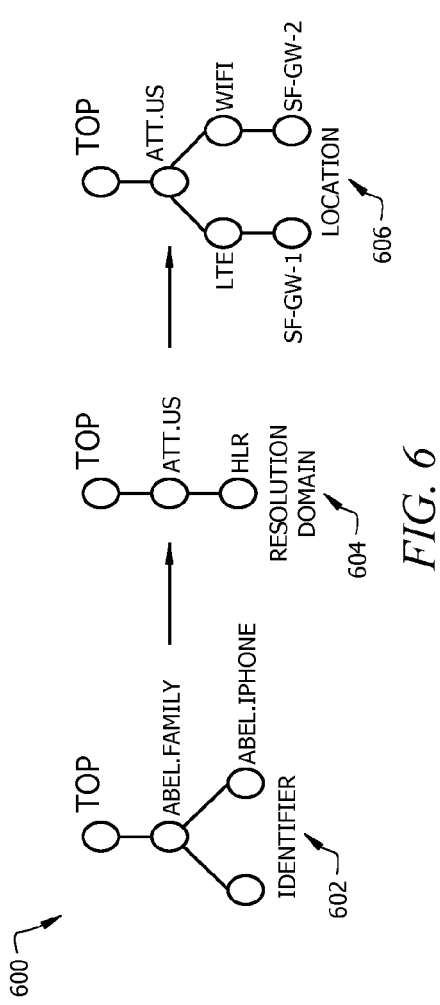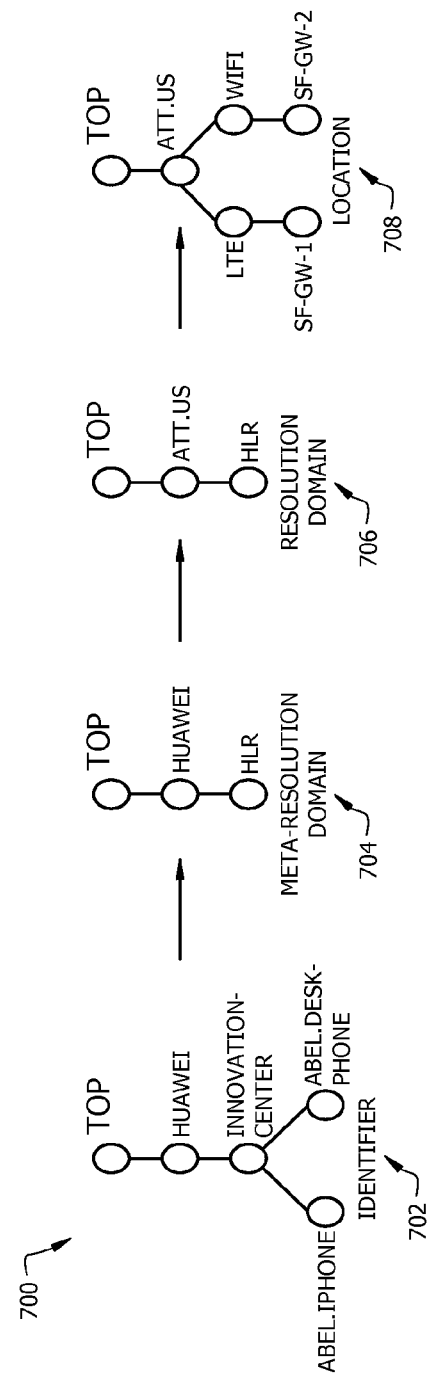
FIG. 6
FIG. 7

PRINCIPAL-IDENTITY-DOMAIN BASED NAMING SCHEME FOR INFORMATION CENTRIC NETWORKS

CROSS-REFERENCE TO RELATED APPLICATIONS

The present application claims the benefit of U.S. Provisional Patent Application No. 61/637,673 filed Apr. 24, 2012 by Xinwen Zhang, et al. and entitled "Naming Scheme for Content-Oriented Network Architecture," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An Information Centric Network (ICN) is a type of network architecture in which the focus is on locating and providing information to users rather than on connecting end hosts that exchange data. One type of ICN is a Content Oriented Network (CON). In a CON, also referred to as a Content Centric Network (CCN), a content router is responsible for routing user requests and content to proper recipients. In the CON, a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network.

SUMMARY

In one embodiment, the disclosure includes a network node in an ICN, comprising a receiver configured to receive a request for content from a user, wherein the request comprises a name, wherein the name uniquely identifies the content associated with the name, wherein the name provides persistently locatable routing to the content, wherein the name provides meaning to an application, and wherein the name comprises a security verifier, a processor coupled to the receiver and configured to determine a next hop to which to forward the request based on the name, and a transmitter coupled to the processor and configured to forward the request to the next hop.

In another embodiment, the disclosure includes a method for retrieving content implemented in a network node in an information centric network, comprising receiving at a receiver an interest for content, wherein the interest comprises a content object name, wherein the content object name comprises a principal, an identifier, and a domain, obtaining a location associated with the domain, determining with a processor a routing path to a content source from which the content may be obtained using the location, and forwarding with a transmitter the interest to the content source, wherein the content object name is persistent and independent of the location.

In another embodiment, the disclosure includes, a content router in an information centric network, comprising a receiver configured to receive an interest packet comprising a content name, wherein the content name comprises a principal, an identifier, and a domain, wherein the identifier provides application binding to the content, the domain provides network binding to the content, and the principal provides security binding to the content; a transmitter; a processor coupled to the receiver and the transmitter; and a content store coupled to the processor, wherein the processor is configured to: retrieve the content from the content store based on the principal and the identifier when the content is stored in the content store; obtain a routing location for a content source from which the content may be obtained from a name resolution service (NRS) based at least in part on the domain when the content is not stored in the content store; and instruct the transmitter to forward the interest request to the content source based at least in part on the routing location.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a diagram illustrating an exemplary naming relationship between an identifier and a location for a content object in a static location resolution service in accordance with a disclosed embodiment.

FIG. 7 is a diagram illustrating an exemplary naming relationship between an identifier and a location for a content object in a dynamic location resolution service in accordance with a disclosed embodiment.

DETAILED DESCRIPTION

Figure 1:
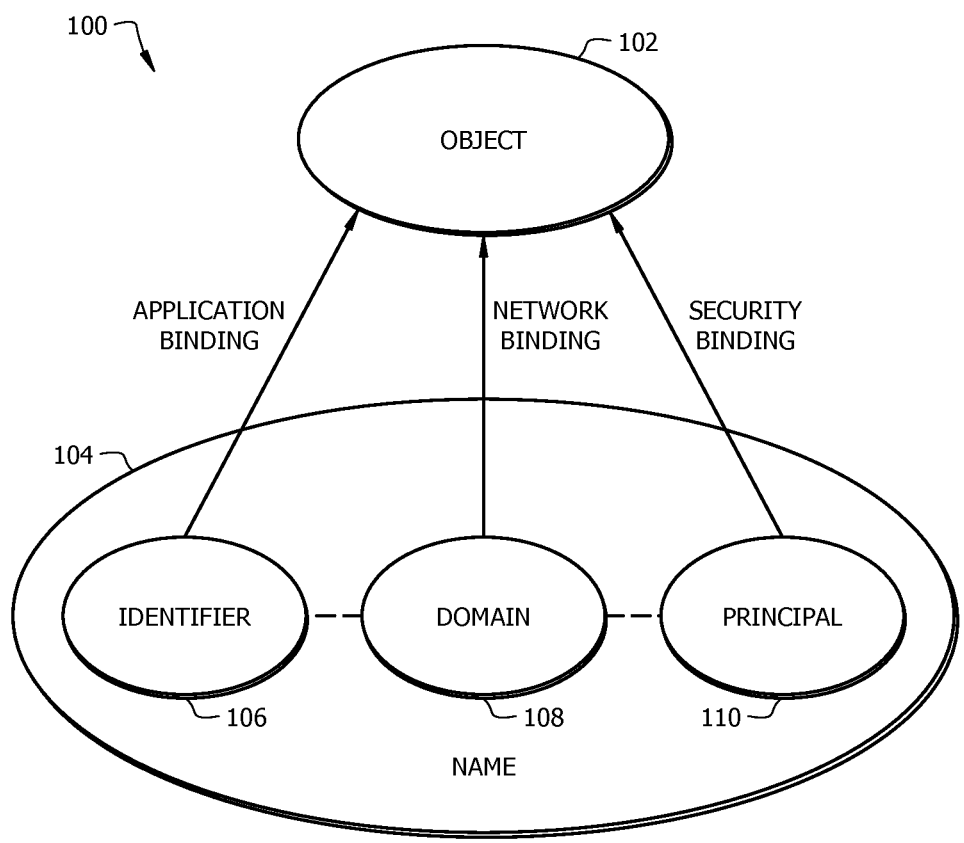
FIG. 1 is a schematic diagram of a naming scheme for a content object in accordance with a disclosed embodiment.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatuses for implementing a naming scheme, which may be used in content-oriented network architecture, information-centric network architecture, and many other Internet architectures where communication is based on content name and content may be cached in network routers. Collectively, these networks may be referred to as information-centric networks (ICNs). Such ICNs provide unique features beyond current IP-based Internet architectures, including high efficient content dissemination, content security, multi-path forwarding. The content name is an important part of these ICN architectures, since substantially all primitive operations may be based on the content name. Examples of primitive operations based on the content name may include issuing communication interests, caching content in network routers, and security and trust.

Disclosed herein is a methodology to name content and other network entities (e.g., devices, nodes, services, etc.) with a P:I:D scheme, where P is a principal, I is an identifier, and D is a domain. One feature of the disclosed naming scheme is flexibility since the naming scheme may support many legacy and future network naming schemes. Another feature of the disclosed naming scheme may be persistence—the name may be separated from location such that a location change does not affect the name. Another feature of the disclosed naming scheme may be the ability to locate the content, since the content may always be locatable based on the name itself. Yet another feature of the disclosed naming scheme may be strong binding, e.g., the name and the content may be strongly bounded.

The disclosed naming scheme may distinguish between two types of names: content name and routing name. A binding relationship between the content name and the routing name may be established. A content name may identify a content object in a persistent way, such that the content name may not be changeable and such that a client may always use this name to: (1) retrieve the content from network, and (2) verify the binding of the content and the name. A routing name (or routing label) may be a network dependent name, which is usually routable within the network, such that a network node or client may reach the content using the routing name. Usually, a routing name is the real location (or locator) of the content in the network, or a dynamic resolution service that points to the real location of the content. Per-domain-based (globally or locally) naming resolution services (NRS) may be available to map a content name to routing names. While per-domain NRS updates the routing names (or labels) for the same content name, the per-domain NRS updates may create late-binding routing behavior. A single content name may be mapped to multiple routing names.

The disclosed naming scheme may provide a unique or relatively unique name to identify the content associated with the name. The disclosed naming scheme may provide that the content is always locatable for routing. The disclosed naming scheme may be flexible and readable thereby providing meaning and flexibility to applications and services in naming their content objects. The disclosed naming scheme may be bindable (e.g., provide a security verifier) to enable efficient checks to determine if the content is correctly named in the network and may enable trust verification at the end device (perhaps with the aid of an external trust management mechanism (e.g., Public Key Infrastructure (PKI)). The disclosed naming scheme may allow for multiple domains in one name and may support multiple NRSs at the same time. The disclosed naming scheme may provide mobility support and support late-binding of addresses to a PDU. Additionally, the disclosed naming scheme may support both legacy and future network architectures.

Some other naming schemes do not provide the benefits provided by the disclosed naming scheme. For example, flat (self-certified) naming schemes may not be locatable and readable. Some hierarchical human-readable naming schemes may not be bindable or trustable. Some hierarchical flat naming schemes may not be readable or trustable. Other naming schemes, such as Cisco's naming scheme, may not be persistently locatable and bindable.

FIG. 1 is a schematic diagram of a naming scheme 100 for a content object in accordance with a disclosed embodiment. Naming scheme 100 shows an object 102 comprising a name 104. The name 104 may comprise an identifier (I) 106, a domain (D) 108, and a principal (P) 110. A content name 104 may be a persistent name instead of a dynamic and network-state aware name. That is, at any time a name 104 may provide persistent information about the target object 102. Logically, a content name 104 may be in the format of P:I:D, where P represents the principal 110, I is the identifier 106, and D is the domain 108. P may bind the object with a complete name for security purposes and for different relationships (e.g., ownership, administration, and social relations). P 108 may be constructed by hashing the public key of the principal or by hashing the content object 102 itself if the content object 102 is static (e.g., unchanging over time). I may be the identifier 106 of the content object 102 in varying forms and may be referred by an end user, applications, and an intermediate content router. I may be something chosen by a publisher or network service, or any other entity that are administrated by authorities. I may be hierarchical or flat. I may be user-readable or non-readable, and may usually be location independent. The relationship between I and the content object 102 may be referred to as application-binding. D may be the domain 108 that provides resolution from P:I to the routing names of the object 102. For persistence purpose, D can be in form of (1) the locator of the target object 102 if the locator is persistent, (2) the resolution service name that maps the content name to its real location (e.g., a routing label) if the resolution service is persistent, (3) a resolution service name that maps the content identifier to another resolution service name or location (e.g., a meta-domain), or (4) any combination of the above. The relationship between D and the content object 102 may be referred to as network-binding. For example, D may be the domain name of the publisher's domain's gateway, service, or host that may resolve P-I. Alternatively, D may be a domain name of a redirection gateway, service, or host to preserve name persistence or to deal with mobility or hosted services. D may be the "fallback" used for name-resolution if P-I is not reachable in the local cache or the requesting domain.

D may usually be routable (globally or locally), such that when an application or network node first receives an interest with the content name, the network node may query a NRS by routing with D and obtain the real location or locator for the named object. In the case in which the NRS is not static, a recursive name resolution may be performed, e.g., the D points to a static NRS which in turn points to a dynamic NRS which points to the location of the object 102. D may be optional if I is routable within a given domain.

Figure 8:
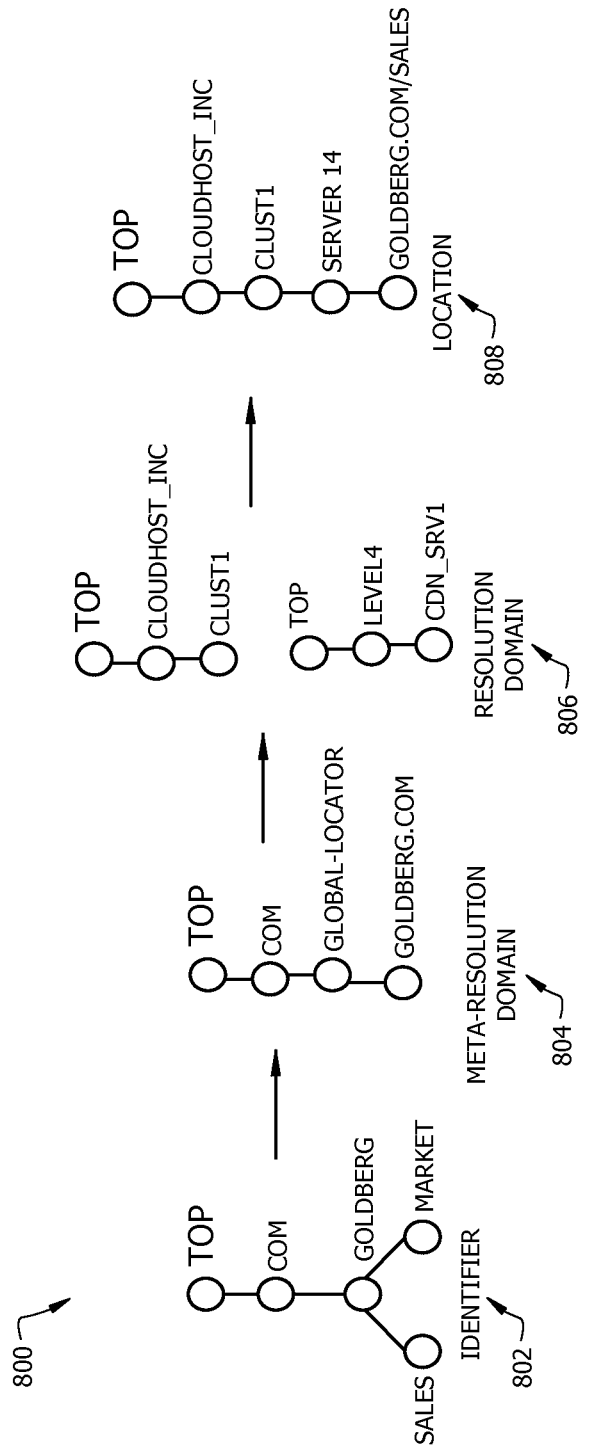
FIG. 8 is a diagram illustrating an exemplary naming relationship between an identifier and a location for a content object in a dynamic location resolution service using a Cisco-based name in accordance with a disclosed embodiment.

The domain concept in the disclosed naming scheme 100 may be more general than the administration domain in the current Internet architecture. The relationship between a named object 102 and its domain 108 may be for location resolution and routing purposes. The domain 108 may be the same as the administration domain of the content object 102, or may be the same as that of a $3^{rd}$ party resolution service provider, for which the designated domain provides resolution services. In a more general way, the domain 108 of a name 104 may have social-, admin-, owner-, and host-relationships with the named object 102, which may imply that domain 108 provides a resolution service to locate a content object 102 with its name. A domain 108 may provide a Domain Name System (DNS) like service that maps a content identifier 106 to the location of the object 102 or the resolution service. In contrast to current Internet centralized DNS, a domain-based resolution may be more general and may be provided in a distributed manner. Furthermore, the meta-domain of a content object 102 may be a personal profile, e.g., in social network service, an enterprise directory service, a cloud service provider, or a web hosting service. For example, to support the example of a dynamic location resolution service as depicted in FIG. 8 using a Cisco®-based name, the domain 108 part of the content name 104 may simply be the service name or location of the lookup database, which may be more persistent than the mapping of a content identifier 106 to location. Note that when using a Cisco®-based name, the lookup database may be assumed to be static and pre-known by the network, which may not be realistic and flexible enough.

Instead of a very specific format of routing names, the naming scheme 100 may support variant routable names (or routing labels), e.g., a network address or a locator. For a content name P:I:D, the D may resolve P:I to one or many routing labels. An application or a network router may choose one routing label to reach the content or choose more routing labels for multicast. A routing label for a content object 102 may be dynamic and may be changed from domain to domain. For example, a single domain may by default set a gateway routing label to all the clients it is serving. The gateway may then replace routing label with some other label. In this manner, the routing label may allow policy-based intra/inter-domain routing, late binding for mobility, and delay-tolerant content routing.

In general, with a content name P:I:D, a network node (e.g., an access router) may first route to a naming resolution service (NRS) with D. With the input of P:I, the NRS may return the routing label of the content object 102, e.g., a location or a locator. In some cases, the NRS may return the name of another NRS, with which the network node can retrieve the routing label of the target content. Upon receiving this, the network node may insert this label in the head of the interest packet. The network may then use this routing label to reach the next hop, to retrieve the named content by using P:I at each hop, and to forward data back to the requester. Otherwise, in a framework where a separate locator address space is not managed, a per-hop forwarding may also be adopted where the content router attempts to resolve the content name I locally in the content router's cache and, if unresolvable, the content router may use I:D or just D to route to domain D. In the latter case, once D is reached, the request I:D may be used to route to location(s) of the content object 102.

Logically, a data PDU may be of the form <P:I:D, <Routing Label>, C, Sign_P(I:D,C), Metadata>, where C is the content payload, Sign_P is a signature generated from the private key corresponding to P on C and persistent content name, and the metadata may include other meta attribute information. With this hybrid naming approach, the naming scheme 100 may achieve the benefits of both pure self-certified names and hierarchical names. Specifically, similar to a hierarchical human-readable name, the P:I part of the name scheme 100 may be globally unique and readable (if needed). With D, the name scheme 100 may be persistently locatable without a real location of the content object 102 in the name 104. With the P part, the name scheme 100 may achieve strong binding between content and the content's name for security and data integrity. Note that trust management may be built on some external mechanism out of the naming scheme 100.

As compared with other naming schemes, the naming scheme 100 may provide several benefits. P:I:D may have better a persistence property since P:I:D separates routing labels from content names. However, in some other naming schemes, a content ID may include both routing labels and an identifier. Thus, in these other naming schemes, when the routing label of a content is changed (e.g., the host service is changed, or a new host service is added), the content ID may need to be changed. However, changing the content ID destroys the name persistency. Additionally, P:I:D may have stronger security binding of the name and content via the principal field 110 than is provided by some other naming schemes.

In a special case, the D of a content name P:I:D may also serve as a routing label. Based on the context the D may serve dual purposes as a resolution/redirection point or as a routing label (e.g., D could directly resolve to a container (server)). This may avoid one round-trip time (RTT) to obtain the Routing Labels of the content name.

It should be noted that for purposes of this disclosure, the focus is substantially on the logical semantics of fields in a naming scheme 100. However, in different embodiments, variant formats of P:I:D may be options. For example, I:D may be in a single component which may act as a resolvable identifier.

Figure 2:
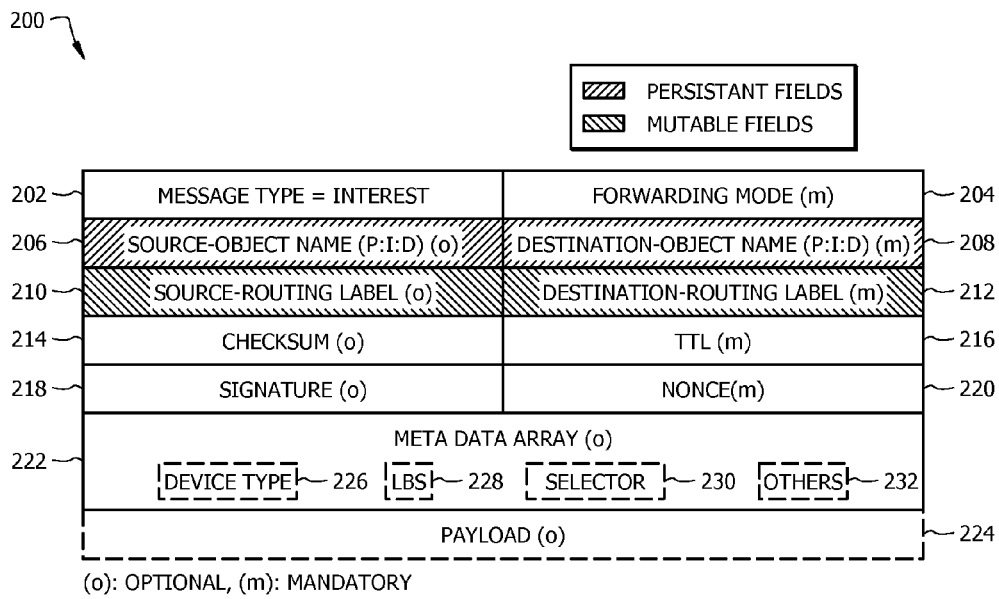
FIG. 2 is a diagram illustrating a Protocol Data Unit (PDU) format for an interest packet according to a disclosed embodiment.

FIG. 2 is a diagram illustrating a PDU format for an interest packet 200 according to a disclosed embodiment. The PDU formatted interest packet 200 may comprise a message type field 202, a forwarding mode field 204, a source-object name field 206, a destination-object name field 208, a source-routing label field 210, a destination-routing label field 212, a checksum field 214, a time to live (TTL) field 216, a signature field 218, a nonce field 220, a meta data array field 222, and a payload field 224. The source-object name field 206 and the destination-object name field 208 may be persistent fields. The source-routing label field 210 and the destination-routing label field 212 may be mutable fields.

The message type 202 may comprise one or more bits or a flag to indicate that the interest packet 200 is an interest data packet. The forwarding mode field 204 may indicate the type of forwarding to be applied to the interest packet 200 by a content router. The source-object name 206 may be the name of the source-object using a P:I:D naming scheme such as naming scheme 100. The destination-object name field 208 may provide a destination-object name in the P:I:D naming scheme format such as naming scheme 100. The source-object content name 206 and the source-routing label 210 may support dual mode forwarding. Initially, when there is no destination routing label field 212 set, the destination routing label field 212 may be the same as the destination content object name's D (e.g., domain). After the routing label is resolved, the response to the first interest may be the actual routing label.

The checksum field 214 may provide a fixed-size datum computed from an arbitrary block of data for the purpose of detecting accidental errors that may have been introduced during the data packet's 200 transmission or storage. The TTL field 216 may provide a time limit that limits the lifespan or lifetime of the interest packet 200 in a network or router. The signature field 218 field may provide security and limit forgery of the interest packet 200. The nonce field 220 may comprise a random or pseudo-random number issued as part of an authentication protocol. The meta data array field 222 may comprise descriptive information about the content in the payload field 224. The meta data array field 222 may comprise a device type 226, a location based service (LBS) 228, a selector 230, and other meta data 232. The device type 226, the location based service (LBS) 228, and the selector 230 are examples of meta data that may be contained within the meta data array field 222. The payload field 224 may comprise the content of the interest packet 200.

Figure 3:
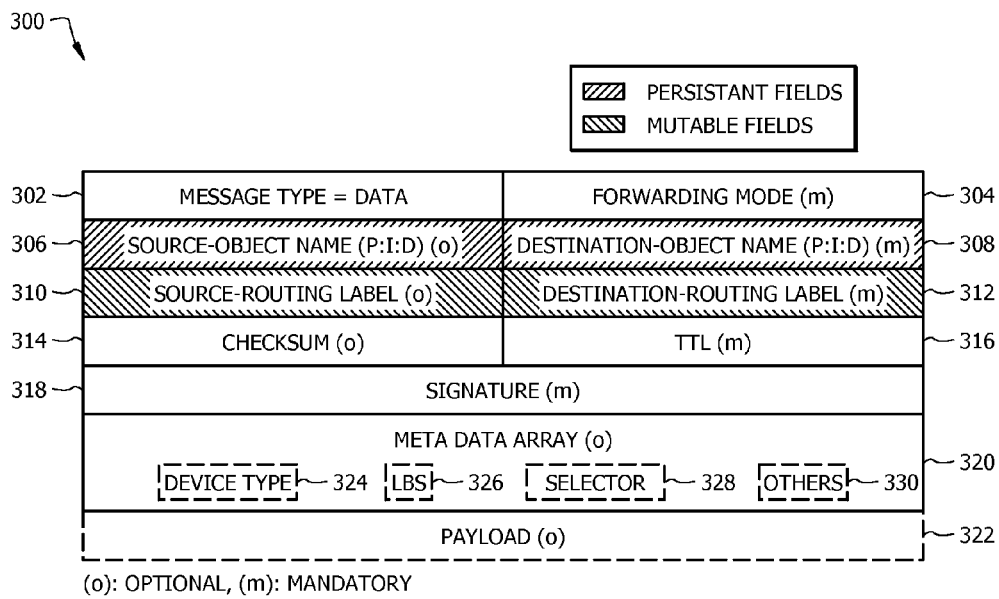
FIG. 3 is a diagram illustrating a PDU format for a data packet according to a disclosed embodiment.

FIG. 3 is a diagram illustrating a PDU format for a data packet 300 according to a disclosed embodiment. The data packet 300 may comprise a message type field 302, a forwarding mode field 304 a source-object name field 306, a destination-object name field 308, a source-routing label field 310, a destination-routing label field 312, a checksum field 314, a TTL field 316, a signature field 318, a meta data array field 320, and a payload field 322. The message type field 302 may comprise one or more bits or a flag to indicate that the data packet 300 is a data packet (as opposed to an interest packet). The forwarding mode field 304, the source-object name field 306, the destination-object name field 308, the source-routing label field 310, the destination-routing label field 312, the checksum field 314, the TTL field 316, the signature field 318, the meta data array field 320, and the payload field 322 may be substantially similar to the corresponding fields for interest packet 200 depicted in FIG. 2. The meta data array 320 may comprise a device type 324, an LBS 326, a selector 328, and other meta data 330. The device type 324, the LBS 326, the selector 328, and the other meta data 330 may provide substantially similar information as that of the device type 226, the location based service (LBS) 228, the selector 230, and the other meta data 232 depicted in FIG. 2.

With a content name of P:I:D, in an embodiment, only I and P may be used for content store (CS) and pending interest table (PIT) operation (in the context of CCN) since P:I provides global uniqueness of the content (e.g., to index the cached content and pending interest). This may provide location independency in data storage and forwarding.

According to content dissemination, the content may be cached at an intermediate node along the forwarding path. When a content request is received by a node with the same named content in the cache, the node (e.g., router) may use the I:P as the index to retrieve the content from local content store. For content store (CS) and pending interest table (PIT), two content objects with the same I and P are considered as the same and thus, only one may be cached at any time.

The P:I:D naming scheme may lend itself to allowing, consuming, and producing applications to choose naming semantic that meet their requirements in terms of reliability, security, and/or performance metrics. The naming format follows a P:I:D format, where I identifies the named entity with a local or global scope, D may be the authority which may resolve the entity's location(s), and P may securely bind the content object to I. For content routing, I:D may be the relevant portion. As I may be a hierarchical name or a flat name, several options for content routing are possible. In one case, separate ICN domains may be built that may be optimized to deal with either flat names or hierarchical names. Here, the name-resolution service may allow the request to be directed to the appropriate domain criterion determined by the publisher, the consumer, or based on certain routing policies. In another case, a content routing domain may be built where the name-resolution infrastructure may be enabled to deal with both flat names and hierarchical names. In this case, irrespective of the type of naming, a separate locator space may exist to resolve the content name to its location(s).

Figure 4:
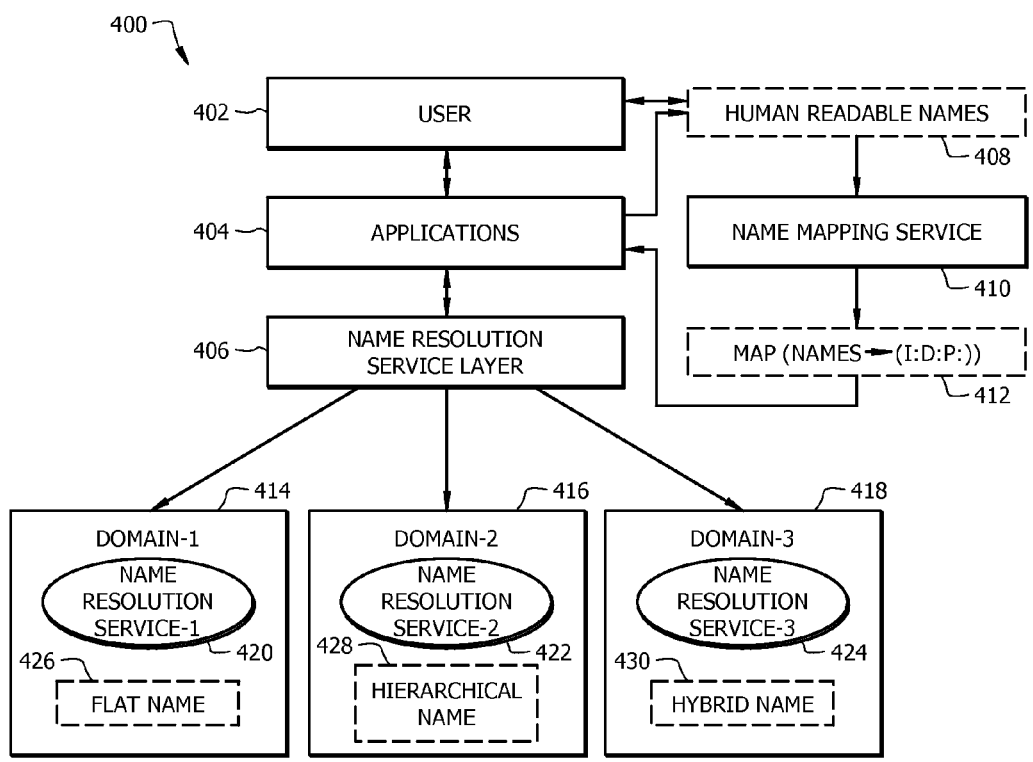
FIG. 4 is a schematic diagram illustrating a high level view name resolution flow according to a disclosed embodiment.

FIG. 4 is a schematic diagram illustrating a high level view name resolution flow 400 according to a disclosed embodiment. The flow 400 shows a high level view of the different components leading from human readable names used by applications to names that would be used by network's name resolution layer to conduct content routing. The name resolution flow 400 may proceed with a user 402 providing a human readable name 408 to an application 404. The application 404 may provide the human readable name 408 to a name mapping service 410 which may map the human readable name to an I:D:P format and return the mapped name 412 to the application 404. The application 404 may then provide the mapped name 412 to the name resolution service layer 406. The name resolution service layer 406 may provide the mapped name to one of name resolution service-1 420 in domain-1 414, to a name resolution service-2 422 in domain-2 416 and to the name resolution service-3 424 in domain-3 418 depending on the name type (e.g., flat name 426, hierarchical name 428, or hybrid name 430).

The name mapping service 410 in FIG. 4 may be a directory lookup service or a search service that the application may use to map the human readable name (correlated to I if it is human readable) to a content plane name(s) of the objects in the network. The name mapping service 410 may be a distributed service that leverages the content routing plane to respond to user queries for specific content. As discussed above different name resolution services 420, 422, 424 may be applied based on the I:D type (e.g., flat name 426, hierarchical name 428, and hybrid name 430).

If the combination of I:D is hierarchical, the content routing may follow a resolution mechanism similar to CCN. To resolve an interest, either I itself may be routable if it is globally unique, or the combination of I:D may be routable. In the latter case, I:D may be interpretable by the name resolution service-2 422 handling hierarchical names 428. Such ICN domains may leverage a longest prefix match to take advantage of name-prefix aggregation thereby mitigating the routing scalability issue.

If I is flat, then the resolution through D may return a routing label(s), which may be appended to the interest packet for intra- and inter-domain name based routing on a fast path. Alternatively, the name resolution may be handled by the global name resolution infrastructure through inter-domain cooperation on a slow path.

There may be several considerations for dynamic name based routing. Based on the particular naming construct (e.g., hierarchical vs. flat vs. hybrid), each of these considerations may achieve the same objectives, respectively, using different mechanisms.

Figure 5:
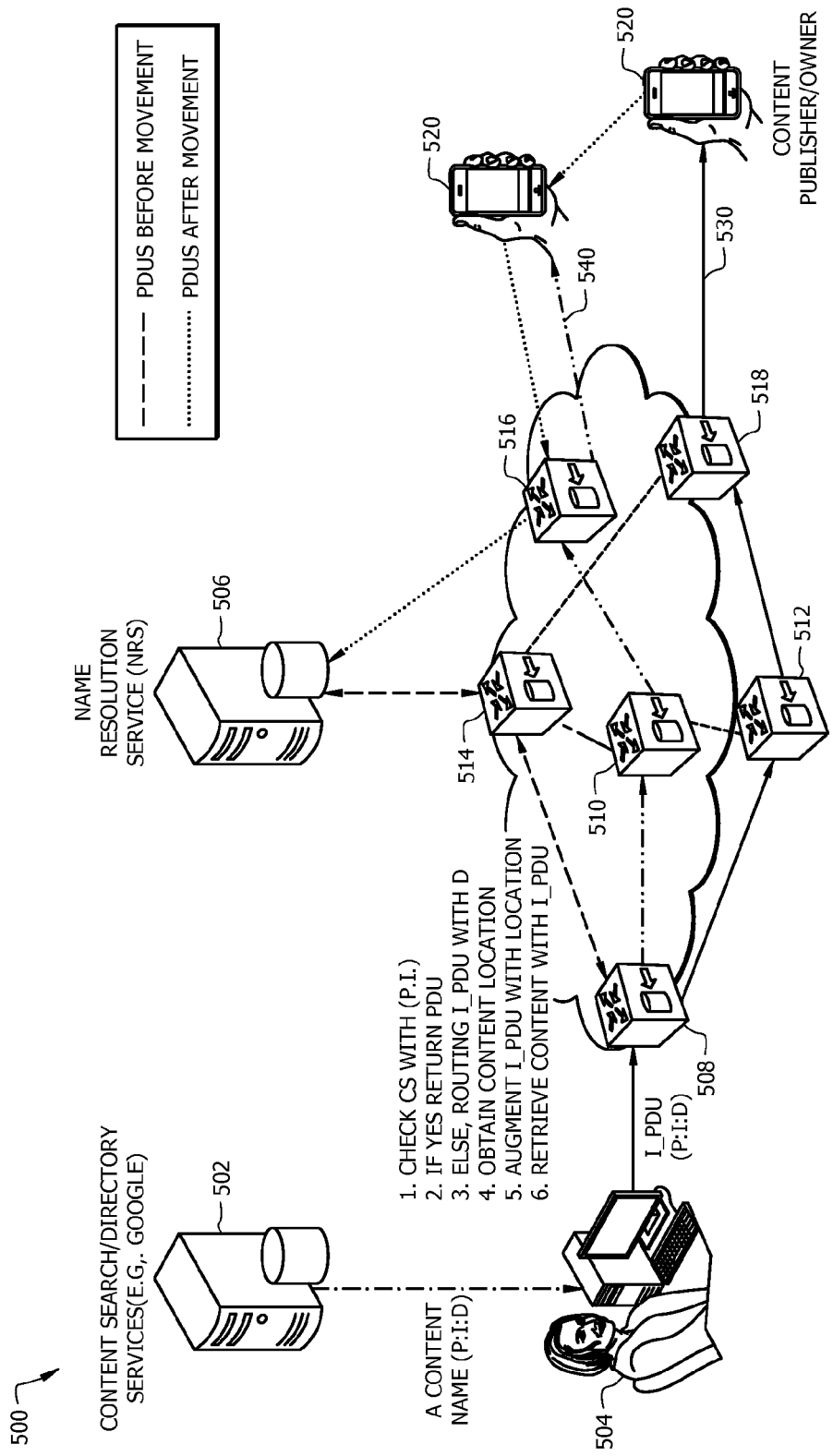
FIG. 5 is a schematic diagram of a network for searching and retrieving content using a naming resolution protocol with the disclosed naming scheme in accordance with a disclosed embodiment.

FIG. 5 is a schematic diagram of a network 500 for searching and retrieving content using a naming resolution protocol with the disclosed naming scheme in accordance with a disclosed embodiment. Network 500 may comprise a content search/directory service 502, a user device 504, a name resolution service (NRS) 506, a plurality of content routers 508, 510, 512, 514, 516, 518, and a content publisher/owner device 520. Content publisher/owner 520 may be mobile and may change locations.

To retrieve content, the user device 504 may query the content search/directory services 502 to retrieve a content name. The content name may be in the form of P:I:D. The user device 504 may then transmit an interest PDU (I_PDU) with the content name (in P:I:D format) to the content router 508. The particular order of the P:I:D in the PDU may vary depending on implementation. For example, the order may be P:I:D, P:D:I, I:P:D, I:D:P, D:I:P, and D:P:I. The content router 508 may check the content store within the content router 508 to determine whether the content associated with the content name is cached in the content store. The content router 508 may use only the P and I of the content name in order to determine whether the content is cached within the content store of the content router 508. If the content associated with the content name is stored in the content store in the content router 508, then the content router 508 may return a PDU with the requested content to the user device 504 without forwarding the I_PDU to the content publisher/owner 520. If the content is not stored in the content store of the content router 508, the content router 508 may route the I_PDU with the D to the NRS 506 via content router 514. The NRS 506 may return the content location information to the content router 508. The content router 508 may augment the I_PDU with the location and forward the I_PDU along path 530 via content routers 512, 518 to content publisher/owner 520 to retrieve the content. Once the content router 508 receives the content from the content publisher/owner 520, the content router 508 may cache the content with the P and I in the content store of the content router 508. The content router 508 may then forward the content to the user device 504.

If the content is stored in the content store of either of content routers 512, 518, that content router 512, 518 may retrieve the content from its content store and provide the content to the content router 508 without forwarding the I_PDU to the content publisher/owner 520. The content router 508 may then cache the content in its content store and forward the content to the user device 504.

If the content publisher/owner 520 moves, the NRS 506 may be updated with the new location information for the content publisher/owner 520. If the NRS 506 receives an I_PDU with D from the content router 508 after the content publisher/owner 520 has moved, the NRS 506 may return a different location to the content router 508. The content router 508 may then augment the I_PDU with the new location information and may forward the I_PDU to the content publisher/owner 520 via a new path 540 via content routers 510, 516 to retrieve the content from the content publisher/owner 520.

Each content router 508, 510, 512, 514, 516, 518 through which the content retrieved from the content publisher/owner 520 passes may cache the content in its own content store. This may enable future requests for the content to be satisfied without forwarding the interest to the content publisher/owner 520, thereby reducing traffic in the network 500.

Network 500 may comprise other network devices, nodes, routers, and servers other than those depicted in FIG. 5. For example, the network 500 may comprise other content routers other than those depicted in FIG. 5. Additionally, the network 500 may comprise other routers and switches that do not cache content. The components of network 500 may be connected via wired and/or wireless communication paths and may be arranged as shown in FIG. 5.

FIG. 6 is a diagram illustrating an exemplary naming relationship 600 between an identifier and a location for a content object in a static location resolution service in accordance with a disclosed embodiment. The naming relationship 600 may comprise associating an identifier 602 with a resolution domain 604 which may be associated with a location 606. As an example of a static location resolution service, suppose Abel.iPhone has an associated family service plan with Top/ATT.US, which may be the resolution domain 604. Assume ATT runs a location lookup service with name Top/ATT.US/HLR, which is the home location registration service that maps a phone identifier 602 to the current access point (e.g., location) 604 in the ATT.US network. Upon activation, Abel (or ATT on behalf of Abel) may register Abel's iPhone with identifier Top/Abel.family/Abel.iPhone in Top/ATT.US/HLR. Some other information (e.g., the phone number, home address, etc.) may be included as the input of the registration. In an embodiment, the content name of Abel's iPhone is "Top/Abel.family/Abel.iPhone:Top/ATT.US/HLR:Hash (phone_numer)", where Hash(phone_numer) may be the hash of the phone number assigned by ATT.US for this iPhone. Optionally, this part may be the hash of the public key of Abel (if available).

Whenever Abel's iPhone attaches to AT&T access network, the point of attachment (PoA) may register the current location of the iPhone, e.g., Top/ATT.US/LTE/SF-GW-1, to Top/ATT.US/HLR. The PoA may also register the Hash (phone_number) from the device. When Alice, Abel's family friend, wants to communicate with (or get content from) Abel.iPhone with an application, the application may use the complete name of Abel's iPhone (P:I:D). A router (or access point, or a related network service) may obtain the domain of the named object (e.g., Top/ATT.US/HLR), which is routable. The router may then retrieve the current location of Abel's iPhone from the domain (e.g., Top/ATT.US/LTE/SF-GW-1), and then the router may put the location information in the PDU head (e.g., interest in CCN), and may begin the communication. Whenever an intermediate router finds a matched cache in its local content store with the identifier of "Top/Abel.family/Abel.iPhone", the intermediate router may simply return the content without retrieving the content from the real device.

FIG. 7 is a diagram illustrating an exemplary naming relationship 700 between an identifier and a location for a content object in a dynamic location resolution service in accordance with a disclosed embodiment. The naming relationship 700 may comprise associating an identifier 702 with a meta-resolution domain 704 which may be associated with a resolution domain 706 which may be associated with a location 708. In this example, Abel's iPhone is owned by Huawei/Innovation-center in Santa Clara, Calif., USA, (Abel's employer) and is used for Abel's work. An identifier 702 may be statically assigned from the enterprise ownership domain, e.g., Top/Huawei/Innovation-center/Abel.iPhone, which may be a unique identifier within Huawei. Since Abel travels a lot globally, Abel's device may attach to different wireless operators, e.g., Top/ATT.US and Top/Vodafone.EU. Therefore, the location resolution service of Abel's iPhone may not be static. Suppose Huawei runs a resolution service (e.g., meta-resolution domain 704) with name Top/Huawei/HLR, which may record the real resolution service name to retrieve the current location of the device. That is, it is the static domain of content name. Therefore, the complete name of Abel.iPhone is "Top/Huawei/Innovation-center/Abel.iPhone:Top/Huawei/HLR: Hash(Pbk_Huawei)", where Pbk_Huawei is the public key of Huawei (or the Innovation-center). When Abel.iPhone attaches to the ATT access network, the point of attachment (PoA) registers the current location of the iPhone, e.g., Top/ATT.US/LTE/SF-GW-1, to Top/ATT.US/HLR, which in turn, registers itself to Top/Huawei/HLR, which may be obtained from the device's name.

When Alice, Abel's colleague, wants to communicate with (or get content from) Abel.iPhone with an application, the application may use the complete name of Abel's iPhone (P:I:D). A router (or access point, or a related network service) may obtain the domain information of the named object, e.g., Top/Huawei/HLR, from the name. The router may then query Top/Huawei/HLR to obtain the current resolution service of the device, e.g., Top/ATT.US/HLR. The router may then query Top/ATT.US/HRL with the identifier Top/Huawei/Innovation-center/Abel.iPhone, which may return the location of the device (e.g., Top/ATT.US/LTE/SF-GW-1). The PoA may put the location information in the PDU head (e.g., interest in CCN) and may begin the communication.

Whenever an intermediate router finds a matched cache in a local content store with the identifier of "Top/Huawei/Innovation-center/Abel.iPhone", the intermediate router may simply return the content form the local content store without retrieving the content form the real device. In an embodiment, Top/ATT.US/LTE/SF-GW-1 may directly register the location of Abel.iPhone to Top/Huawei/HLR. However, in general, Top/ATT.US/HLR may have a better trust relationship with Top/Huawei/HLR for updating the location of the device.

FIG. 8 is a diagram illustrating an exemplary naming relationship 800 between an identifier and a location for a content object in a dynamic location resolution service using a Cisco®-based name in accordance with a disclosed embodiment. The naming relationship 800 may comprise associating an identifier 802 with a meta-resolution domain 804 which may be associated with a resolution domain 806 which may be associated with a location 808. In this example, Jeff runs a small business, Goldberg.com, and buys hosting from CloudHost Inc. CloudHost is an international hosting company which has four datacenters spread across the world. CloudHost may advertise the same routing label, cloudhost.inc_L_glbl, from different hosting application services into the global Internet. CloudHost may provide Jeff with routing labels for the server(s) hosting Jeff's content. The server(s) hosting Jeff's content may act as a name-location resolution service. Jeff may add an entry into the lookup database in global-host.com:goldberg.com->{cloudhostinc_L_clust44|cloudhost.inc_L_glbl}. Jeff's Content-ID labels may now reference his own entry ID:={goldberg.com/sales/contact.html|goldberg.com}, which may be the content identifier in naming scheme. Later, Jeff may add Level-4 as a second hosting provider, which may provide Jeff with new routing labels. Jeff may update his entry in the lookup database in global-host.com:goldberg.com->{cloudhost.inc_L_clust1, level4.cdn_srvr1|level4.cdn_srvclust|cloudhost.inc_L_glb1, level4.cdn}. The persistent name of Jeff's content is "goldberg.com:global-host.com:Hash(PbK_Jeff)", where global-host.com is a domain name that provides the lookup database, which may be globally routable and which may provide locator resolution service for goldberg.com, and PbK_Jeff is the public key of Jeff.

To locate any content with prefix of goldberg.com, a network node may query global-host.com to obtain the locator information of the content identifier (ID) (e.g., goldberg.com), which may return the real host service name of {cloudhost.inc_L_clust1, level4.cdn_srvr1|level4.cdn_srvclust|cloudhost.inc_L_glb1, level4.cdn}. After this, the network node may choose one of them according its local policy. The network node may resolve the real location of the content with prefix goldberg.com, may put the result in the PDU head, and may begin the communication. Whenever an intermediate router finds matched cache in a local content store with the identifier prefix of "goldberg.com", the intermediate router may simply return the content without retrieving the content from the server that hosts the content. One advantage of this naming scheme is that, whenever Jeff changes or update his host service for goldberg.com, the resolution records in global-host.com are updated. Thus, the name may always be persistent for end users and applications.

As discussed above, one content object may have several names. Different names may be assigned from different domains and may be severed for different purposes. Logically, for a single object (e.g., a content, a device, an application, a service, a network nodes, or a human-being), the object may have multiple identifiers. For example, a mobile device may have identifier of the International Mobile Station Equipment Identity (IMEI), a phone number, an IP address, a human readable name (e.g., Alice's iPhone), and an organizational device id (e.g., if the device belongs to a company). User generated content may have a user chosen ID, a uniform resource locator (URL), and a tinyURL. All these identifiers may have a single principal. Therefore, the name of the object may be P:I1: . . . :In:D, where Ix (where x=1, 2, . . . , n) is an identifier, D is a domain that provides name resolution service, and P is the principal.

Figure 9:
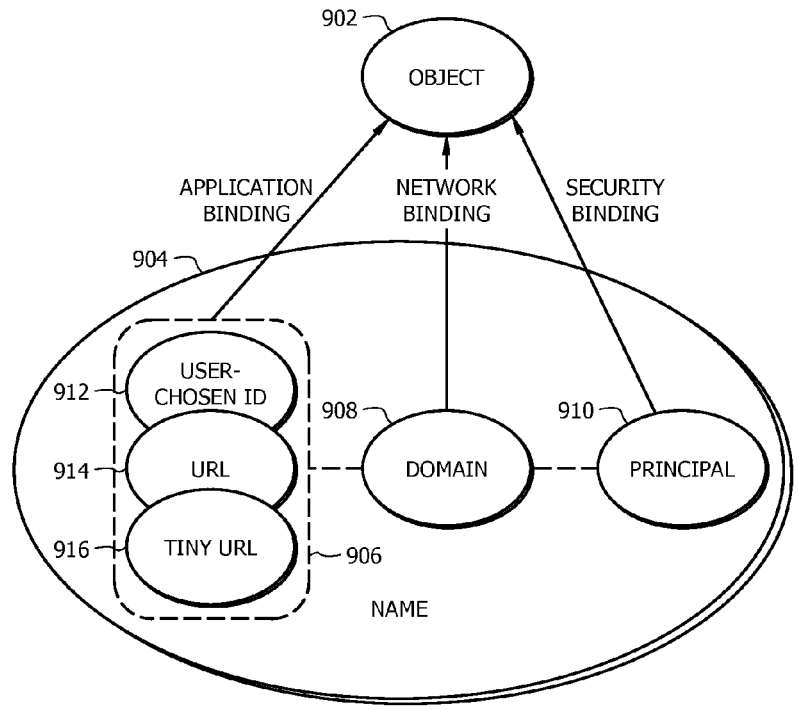
FIG. 9 is a diagram illustrating the principal that a single object may have multiple names.

FIG. 9 is a diagram illustrating the principal that a single object 902 may have multiple names 904. The name 904 may comprise an identifier (I) 906, a domain (D) 908, and a principal (P) 910. The 1906 may provide application binding to the object 902. The domain 908 may provide network binding to the object 902, and the principal may provide security binding to the object 902. The 1906 may comprise any one of three identifiers—user chosen ID 912, URL 914, and tinyURL 916. Thus, for example, as the FIG. 9 shows, a content owner may name the data with several identifiers, including user-chosen names 912, a complete URL 914, and a tinyURL 916. All these identifiers 912, 914, 916 may correspond to a single principal 910, and a single locator (e.g., domain 908), which may resolve the location of the content.

Figure 10:
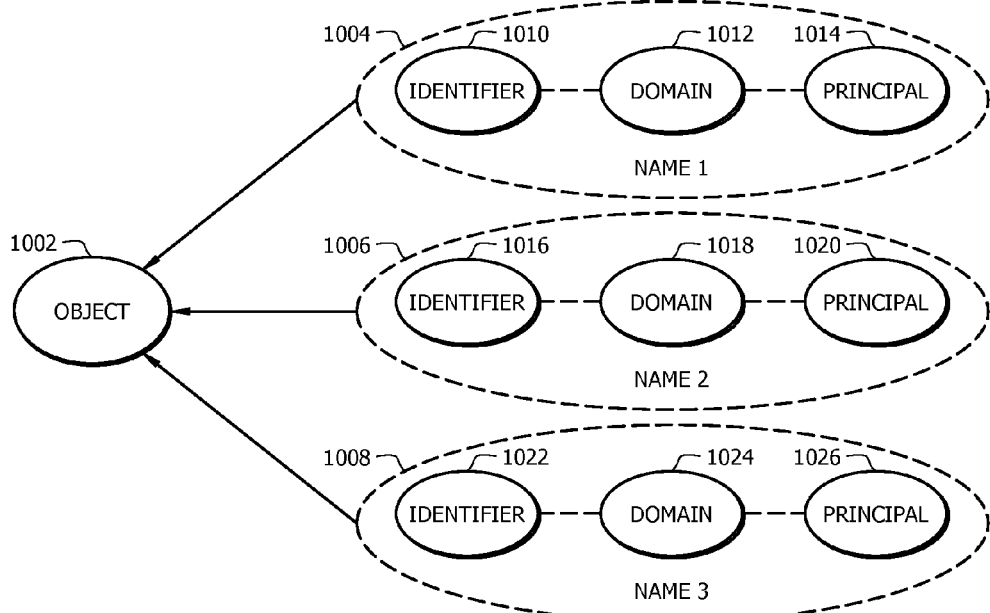
FIG. 10 is a diagram illustrating the relationships between the object, identifiers, and principals for an object with multiple names according to a disclosed embodiment.

In a very general case, each identifier may be associated with different principals, and multiple locators may be used for a single content object, e.g., for load balance and duplication. For example, Abel's iPhone may have different public keys for different names it may use for different network services (e.g., one for Abel's personal use and another from the enterprise). Therefore, the relationships between the object, identifiers, and principals may be illustrated as shown in FIG. 10. Object 1002 may be associated with three different names 1004, 1006, 1008. Name 1 1004 may comprise an identifier 1010, a domain 1012, and a principal 1014. Name 2 1006 may comprise an identifier 1016, a domain 1018, and a principal 1020. Name 3 1008 may comprise an identifier 1022, a domain 1024, and a principal 1026. Each identifier 1010, 1016, 1022 may be different, each domain 1012, 1018, 1024 may be different, and each principal 1014, 1020, 1026 may be different. Since an object 1002 may have many persistent domains 1012, 1018, 1024 (e.g., content may be stored at different host services or CDNs) and one object 1002 may also have many IDs 1010, 1016, 1022 in this generic schema, both domain 1012, 1018, 1024 and identifier 1010, 1016, 1022 may be a multi-element set. Content routers and consumers may select varying elements for content routing and forwarding (based on local-defined policy).

It may be noted that there may be mapping relationships between multiple names of a single object. For example, an object may have a hierarchical identifier within its local domain owned by an enterprise, but may have a flat identifier (hash of its content) with a distributed hash table (DHT) service. There may be a mapping service to link these two names towards the same object. In general, the mapping function between different names of a single object may be used to build flexible relationships between names. For example, an identifier may be derived from another identifier, which may form nested or tunneled names. A principal may be signed by another principal in order, for example, to build a trust relationship between different principals, such as for ownership, administration, and social relationships. A domain name may point to another domain name for the same object.

As an example of multiple names for a single object, consider the situation in which Alice at Huawei/Innovation-center generates a technical report about routing. The technical report about routing may be named as (Huawei/Innovation-center/Alice-CONA-routing-solution, Huawei/PrivatePage, Hash(Pbk_Alice)), where Huawei/PrivatePage is a directory service name that may locate the object identified by Huawei/Innovation-center/Alice-CONA-routing-solution. This name may only be meaningful within the Huawei domain since Alice's public key is not publically available to entities outside of the Huawei domain and since Huawei/PrivatePage may only be available for private access. That is, this name is a private name. When the same content is made public to the Internet, its name may be (Huawei/Innovation-center/CONA-TR-2012-01, Huawei/PublicPage, Hash(Pbk_Huawei)), where the identifier, and domain, and the principal are different from its private copy, although they may have the same content payload. Huawei/PublicPage is the domain that may resolve the identifier to a real location of the content, e.g., a public URL or the Institute of Electrical and Electronics Engineers (IEEE) Digital Object Identifier (DOI) object name. That is, this is the public name of the object. There may be a mapping between the public and private names of the object, e.g., the principal of the public name (Pbk_Huawei) may sign the public key (Pbk_Alice) of the private name, such that an end user may derive the trust of the target object.

The disclosed naming scheme design and implementation may be independent from the trust management infrastructure. The trust of a content object may be derived from the trust of the principal, e.g., the public key of the principal. Either network nodes or end users may verify the trust of a content object according to different security requirements.

Similar to CCN and NDN, the public key of a principal may be a regular ICN data, which may also have a the name in the form of P:I:D. For a public key name, the I may be some domain- or realm-based name, D may be the name (if static) of the certificate directory service of a certificate authority (CA) or a domain that resolves the location of a public key certificate, and the P may be the hash of the CA's public key.

Figure 11:
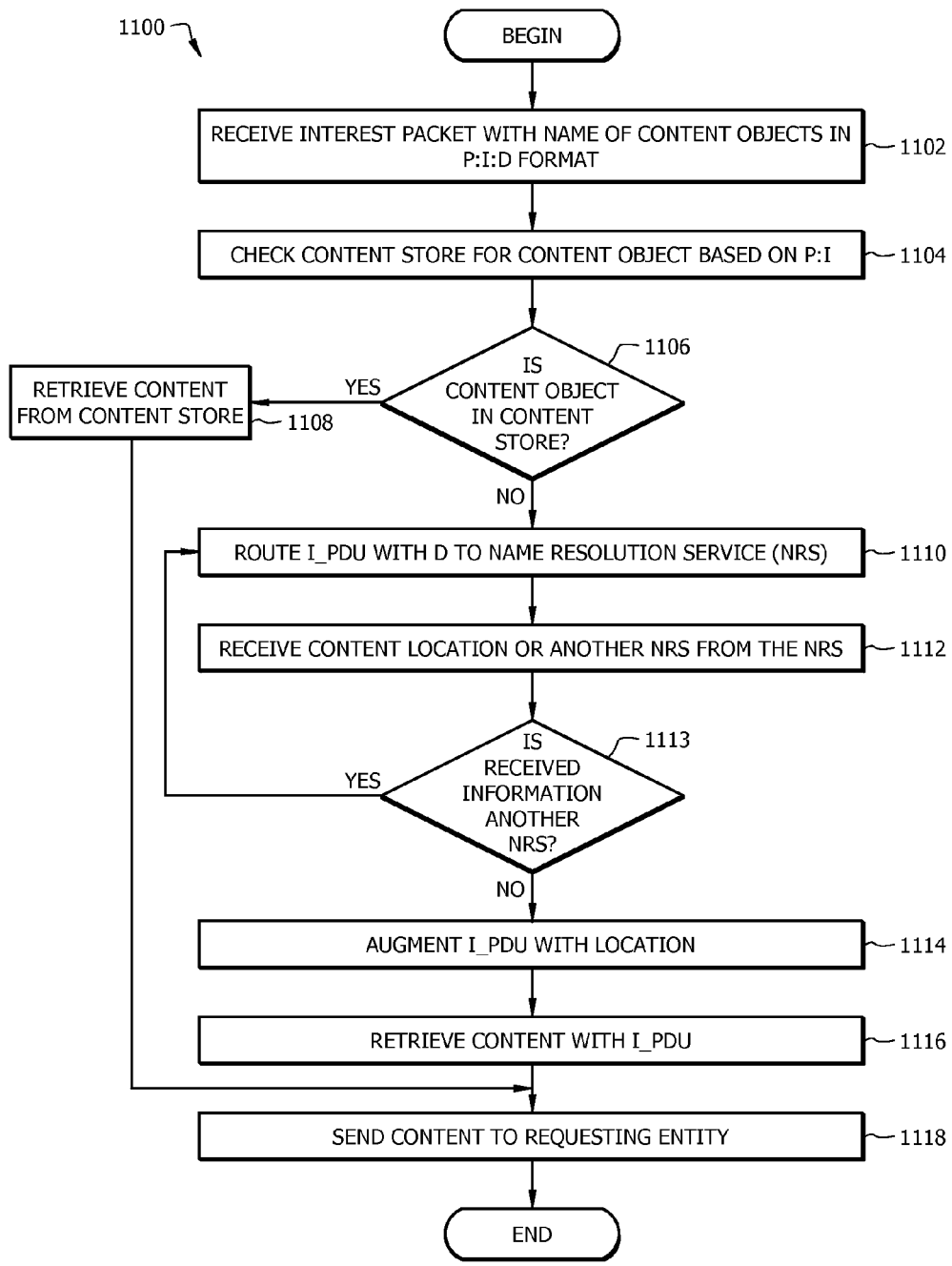
FIG. 11 is a flowchart of a method for retrieving content based on content name according to a disclosed embodiment.

FIG. 11 is a flowchart of a method 1100 for retrieving content based on content name according to a disclosed embodiment. The method 1100 may begin at block 1102, where the content router 508 may receive an I_PDU with the name of the requested content object in the P:I:D format. At block 1104, the content router 508 may check its content store for the content object based on the P and the I. At block 1106, the content router 508 may determine whether the content object is stored in the content store. If, at block 1106, the content is found in the content router's 508 content store, the method 1100 may proceed to block 1108 where the content router 508 may retrieve the content from the content store and then proceed to block 1118. If, at block 1106, the content is not found in the content router's 508 content store, the method 1100 may proceed to block 1110 where the content router 508 may route the I_PDU with the D to the NRS 506. At block 1112, the content router 508 may receive the content location or another NRS from the NRS 506. At block 1113, if the content router 508 receives another NRS rather than a content location, then the method 1100 may proceed to block 1110. Otherwise, at block 1113, if the content router 508 receives the content location from the NRS 506, then the method 1100 may proceed to block 1114. At block 1114, the content router 508 may augment the I_PDU with the location received from the NRS 506 or another NRS. At block 1116, the content router 508 may retrieve the content from the content publisher/owner 520 using augmented I_PDU to route the interest to the content publisher/owner 520. At block 1118, the content router may transmit the requested content to the requesting user device 504, after which, the method 500 may end.

Figure 12:
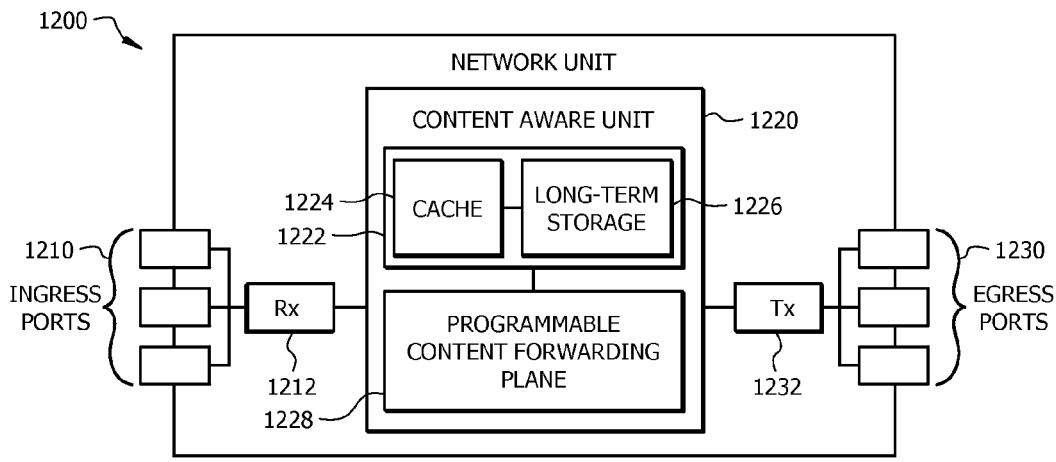
FIG. 12 illustrates an embodiment of a network node, which may be any device that transports and processes data through a network.

FIG. 12 illustrates an embodiment of a network node 1200, which may be any device that transports and processes data through a network. For instance, the network node 1200 may be a content router or any node or router in the network 500 and schemes described above. The network node 1200 may be configured to implement or support the adaptive forwarding strategies described above. The network node 1200 may comprise one or more ingress ports or faces 1210 coupled to a receiver (Rx) 1212 for receiving signals and frames/data from other network components. The network node 1200 may comprise a content aware unit 1220 to determine which network components to send content to. The content aware unit 1220 may be implemented using hardware, software, or both. The network unit 1200 may also comprise one or more egress ports or faces 1230 coupled to a transmitter (Tx) 1232 for transmitting signals and frames/data to the other network components. The receiver 1212, content aware unit 1220, and transmitter 1232 may also be configured to implement at least some of the disclosed methods, which may be based on hardware, software, or both. The components of the network node 1200 may be arranged as shown in FIG. 12.

The content aware unit 1220 may also comprise a programmable content forwarding plane block 1228 and one or more storage blocks 1222 that may be coupled to the programmable content forwarding plane block 1228. The programmable content forwarding plane block 1228 may be configured to implement content forwarding and processing functions, such as at an application layer or layer 3 (L3) in the Open Systems Interconnection (OSI) model, where the content may be forwarded based on content name or prefix and possibly other content related information that maps the content to network traffic. Such mapping information may be maintained in a content table at the content aware unit 1220 or the network unit 1200. The programmable content forwarding plane block 1228 may interpret user requests for content and accordingly fetch content, e.g., based on metadata and/or content name, from the network or other content routers and may store the content, e.g., temporarily, in the storage blocks 1222. The programmable content forwarding plane block 1228 may then forward the cached content to the user. The programmable content forwarding plane block 1228 may be implemented using software, hardware, or both and may operate above the IP layer or layer 2 (L2) in the OSi model. The storage blocks 1222 may comprise a cache 1224 for temporarily storing content, such as content that is requested by a subscriber. Additionally, the storage blocks 1222 may comprise a long-term storage 1226 for storing content relatively longer, such as content submitted by a publisher. For instance, the cache 1224 and the long-term storage 1226 may include Dynamic random-access memories (DRAMs), solid-state drives (SSDs), hard disks, or combinations thereof.

Figure 13:
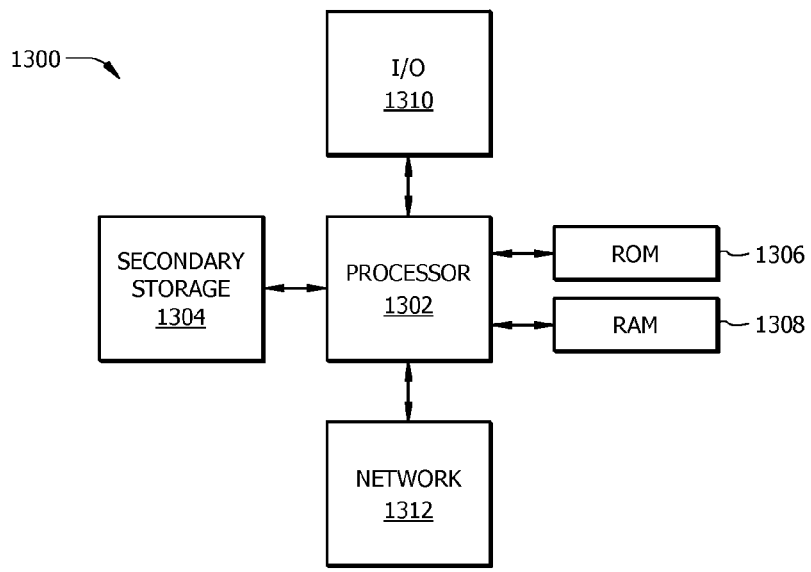
FIG. 13 illustrates a typical, general-purpose network component suitable for implementing one or more embodiments of the components disclosed herein.

The network components described above may be implemented on any general-purpose network component, such as a computer or network component with sufficient processing power, memory resources, and network throughput capability to handle the necessary workload placed upon it. FIG. 13 illustrates a typical, general-purpose network component 1300 suitable for implementing one or more embodiments of the components disclosed herein. For example, the network component 1300 may be implemented as the NRS 506, the content publisher/owner 520, the user device 504, and/or the content search/directory service 502 depicted in FIG. 5. The network component 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. The processor 1302 may be implemented as one or more CPU chips, or may be part of one or more application specific integrated circuits (ASICs).

The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network node in an information centric network (ICN), comprising:
    a receiver configured to receive an interest protocol data unit (I_PDU) from a user device, wherein the I_PDU comprises a content name comprising an identifier, a principal, and a domain, wherein the identifier uniquely identifies a content object associated with the content name, wherein the principal provides a security verifier to the content object associated with the content name, and wherein the domain provides persistently locatable routing to the content object associated with the content name;
    a content store configured to cache a plurality of content objects, wherein each of the content objects is associated with at least one content name;
    a processor coupled to the receiver; and
    a transmitter coupled to the processor,
    wherein the processor is configured to:
        determine, based on the identifier and the principal, whether the content object is cached in the content store;
        retrieve the content object from the content store when the content object is cached in the content store;
        instruct the transmitter to transmit a reply comprising the content object to the user device when the content object is cached in the content store; and
        locate a name resolution service (NRS) using the domain when the content object is not cached in the content store; and send the identifier and the principal to the NRS when the content object is not cached in the content store,
wherein when a routing label is received from the NRS in response to the NRS receiving the identifier and the principal, the processor is further configured to:
augment the I_PDU with the routing label;
determine a next hop based on the routing label; and
forward the I_PDU to the next hop.

2. The network node of claim 1, wherein the content is associated with multiple names, and wherein upon receiving the identifier and the principal, the NRS is configured to:
determine, based on the identifier and the principal, a second routing label associated with the content object; and
return the second routing label to the network node.

3. The network node of claim 1, wherein the user device is configured to query a content directory service to retrieve the content name.

4. The network node of claim 1, wherein, when the network node receives the content object from the next hop, the processor is configured to instruct the transmitter to forward a second reply comprising the content object to the user device.

5. The network node of claim 4, wherein, when the network node receives the content object from the next hop, the processor is configured to cache the content object in the content store and index the content object in the content store with the identifier and the principal.

6. The network node of claim 1, wherein the NRS updates the routing label when a content owner of the content object moves to a new location.

7. The network node of claim 1, wherein the routing label changes dynamically between domains within the ICN and allows for policy-based intra/inter-domain routing, late binding, and delay-tolerant content routing.

8. The network node of claim 1, wherein the identifier is hierarchical.

9. A method for retrieving content implemented in a network node in an information centric network (ICN), comprising:
receiving, at a receiver, an interest protocol data unit (I_PDU) from a user device wherein the I_PDU comprises a content object name, wherein the content object name comprises a principal, an identifier, and a domain;
wherein the identifier uniquely identifies a content object associated with the content object name, wherein the principal provides a security verifier to the content object associated with the content name, and wherein the domain provides persistently locatable routing to the content object associated with the content name;
determining, with a processor and based on the identifier and the principal, whether the content object is cached in a content store in the network node, wherein the content store is configured to cache a plurality of content objects, wherein each of the content objects is associated with at least one content name;
returning with a transmitter a reply comprising the content object to the user device when the content object is cached in the content store;
locating, with the processor, a name resolution service (NRS) using the domain when the content object is not cached in the content store;
sending the identifier and the principal to the NRS when the content object is not cached in the content store; and
forwarding the I_PDU to a next hop via the transmitter when a routing label is received from the NRS in response to the NRS receiving the identifier and the principal, wherein the I_PDU is augmented with the routing label, and wherein the next hop is determined based on the routing label.

10. The method of claim 9, wherein the content object is obtainable from multiple content sources.

11. The method of claim 9, wherein the content name comprises multiple domains.

12. The method of claim 9, wherein the content name supports late binding of an address to a protocol data unit (PDU).

13. The method of claim 9, wherein the domain is a domain name of a publisher domain gateway, a publisher domain service, or a publisher domain host.

14. The method of claim 9, wherein the domain is a domain name of a redirection gateway, a redirection service, or a redirection host.

15. The method of claim 9, wherein the identifier uniquely identifies the content object associated with the content name, wherein the principal provides a security verifier to the content object associated with the content name, and wherein the domain provides persistently locatable routing to the content object associated with the content name.

16. A content router in an information centric network (ICN), comprising:
a receiver configured to receive an interest protocol data unit (I_PDU) from a user device comprising a content name, wherein the content name comprises an identifier, a principal, and a domain, wherein the identifier uniquely identifies a content object associated with the content name, wherein the principal provides a security verifier to the content object associated with the content name, and wherein the domain provides persistently locatable routing to the content object associated with the content name;
a content store configured to cache a plurality of content objects, wherein each of the content objects is associated with at least one content name;
a transmitter;
a processor coupled to the receiver and the transmitter, wherein the processor is configured to:
retrieve the content object from the content store based on the principal and the identifier when the content object is stored in the content store;
instruct the transmitter to transmit a reply comprising the content object to the user device when the content object is cached in the content store; and
locate a name resolution service (NRS) using the domain when the content object is not cached in the content store; and
send the identifier and the principal to the NRS when the content object is not cached in the content store,
forwarding the I_PDU to a next hop via the transmitter when a routing label is received from the NRS in response to the NRS receiving the identifier and the principal, wherein the I_PDU is augmented with the routing label, and wherein the next hop is determined based on the routing label.

17. The content router of claim 16, wherein the principal comprises a hash of a public key of a content owner or content administrator.

18. The content router of claim 16, wherein the principal comprises a hash of the content object.

19. The content router of claim 16, wherein the identifier is hierarchical.

20. The content router of claim 16, wherein the identifier is flat.

* * * * *